United States Patent [19]

Smith et al.

[11] Patent Number: 5,046,157
[45] Date of Patent: Sep. 3, 1991

[54] TIME CONTROL DEVICE FOR APPLIANCES

[76] Inventors: Stephen W. Smith, 108 Pinecroft Dr., Raleigh, N.C. 27609; Leland W. Poole, 4600 Yates Pond Rd., Raleigh, N.C. 27606; William C. Stewart, 7616 Elliott Dr., Raleigh, N.C. 27612

[21] Appl. No.: 152,032

[22] Filed: Feb. 3, 1988

[51] Int. Cl.$^5$ .............................................. G08B 1/00
[52] U.S. Cl. ........................... 340/309.15; 340/825.33; 235/382.5
[58] Field of Search ...................... 340/309.15, 825.31, 340/825.33; 235/382, 382.5, 375

[56] References Cited

U.S. PATENT DOCUMENTS

| | | | |
|---|---|---|---|
| 4,348,696 | 9/1982 | Beier | 340/825.31 |
| 4,385,231 | 5/1983 | Mizutani et al. | 235/375 |
| 4,624,578 | 11/1986 | Green | 340/309.15 |

Primary Examiner—Joseph A. Orsino
Assistant Examiner—Frank M. Scutch, III
Attorney, Agent, or Firm—Rhodes, Coats & Bennett

[57] ABSTRACT

A controlled device is disclosed for allowing a parent to control the use of an appliance by a child. The system includes a plurality of user cards, one of which is assigned to each child. A control device is interconnected with the circuitry of the appliance for actuating and deactuating the controlled appliance. The amount of time allotted to each child can be stored in the memory of the control device. The control device is responsive to input from the children's user cards and actuates the controlled appliance when the time allotted to such user is greater than zero. Once the controlled appliance is actuated, the time allotted to the then current user is decremented until the appliance is deactuated. When the time alloted to the then current user reaches zero, the control device will automatically deactuate the controlled appliance and that child cannot use the appliance until more time is allotted to him or her. The parent is given a master card which allows him to manually increment or decrement the time allotted to each child user. Thus, the device may be used to positively reinforce desired behavior and to discourage undesired behavior.

6 Claims, 6 Drawing Sheets

TIME CONTROL DEVICE FOR APPLIANCES

FIELD OF THE INVENTION

The present invention relates generally to control devices or appliances and more particularly, to time responsive control devices.

BACKGROUND OF THE INVENTION

Control devices which allow one person to control the use of an appliance by another person are known in the art. In its simpliest form, such control devices comprise a coin box interconnected with the circuitry of the appliance which actuates the appliance upon payment of a predetermined sum of money. One such system is described in U.S. Pat. No. 4,566,033 to Reidenoar. Fee charging apparatuses for television sets are also known and are commonly used in hotels. Examples of such fee charging systems are disclosed in U.S. Pat. Nos. 4,085,422 to Ninata et al; 4,012,583 to Kramer; and 4,700,296 to Palmer.

Control devices that allow a parent to selectively control the amount of time that a child uses an appliance such as a television set, are also known in the art. One such device is disclosed in U.S. Pat. No. 4,348,696. The control device disclosed in the patent to Beier records the viewing time of one or more viewers watching a controlled television set and turns the set off when a predetermined viewing time limit of any one of the viewers is exceeded. An individual password for each viewer is stored in the control device's internal memory along with a predetermined viewing time associated with each of the passwords. During the programmed viewing period (daily or weekly), the amount of viewing time remaining for each password code begins decreasing when the viewer turns on the control device. When the time remaining reaches zero, the television set is deactivated. However, when the assigned viewing period terminates the microprocessor automatically restores the predetermined viewing time to each of the password codes. Thus, for example, if a viewers time period is on a daily basis and is 120 minutes long, the viewers time limit will be restored to 120 minutes at the end of each day no matter how much of the previously allotted time was used.

One drawback to the control device disclosed in the patent to Beier is that once a predetermined amount of time is allotted to a viewer, that time cannot be altered until the end of the assigned viewing period. At that time, the control device will automatically restore each of the predetermined time limits for each password code. There is no mechanism by which the parent can manually increment or decrement the time alloted to a particular viewer prior to the end of the predetermined viewing period. Thus, a valuable opportunity to positively reinforce desired behavior or to discourage undesired behavior is lost.

The patent to Jackson, U.S. Pat. No. 4,081,754, also discloses a device for limiting the viewing periods throughout a predetermined time period i.e. one week. The device can be used to allow viewing on selected channels to the exclusion of all others during the predetermined periods.

SUMMARY AND OBJECTS OF THE INVENTION

The present invention was developed to provide an electronic control device which allows a parent to control the use of an appliance by a child. Each child is given a user card encoded with a discrete user identification code. During initialization of the device, the parent can enter the amount of time which will be allotted to each child for using the appliance. When the child uses the appliance, he must pass his card through an optical card reader to identify himself to the control device. The microprocessor will then determine whether that child has any time remaining and if so, will actuate the controlled appliance. Once the appliance is actuated, the control device will decrement the time allotted to that child until the controlled appliance is deactuated. When the allotted time for any current user reaches zero, the control device automatically deactuates the controlled appliance.

The parent is provided with a master card and program card which allows him to enter certain program functions. In the add/delete mode, the parent can manually increment or decrement the amount of time allotted to each child. If the child exhibits desirable behavior, the parent may add to the amount of time allotted to that child in order to positively reinforce the desired behavior. On the other hand, if the child exhibits behavior which the parent wishes to discourage, he may delete time from that child's user card.

In the auto on/off mode, the parent can set predetermined times at which the appliance will be enabled and disabled. The auto on/off function overrides the normal operating function so that the child cannot use the appliance during the disabled periods, whether or not any time remains on his or her card. In the auto increment mode, the parent can select an amount of time to be added to each child's user card on a daily basis. The control device will add that amount of time to each child's user card at a predetermined time each day.

From the foregoing, it is apparent that the primary object of the present invention is to provide an electronic device for controlling use of an appliance as part of the positive reinforcement of desired behavior.

Another object of the present invention is to provide a control device for limiting the amount of time a child can use an appliance and thus, discipline the child to budget the time spent using the appliance.

Another object of the present invention is to provide a control device which automatically disables the controlled appliance during predetermined intervals of time so that it may not be used by the child during the disabled periods.

Another object of the present invention is to provide a method for storing and retrieving data from an optically encoded card.

Another object of the present invention is to provide an optically encoded card which is resistant to tampering.

Other objects and advantages of the present invention will become apparent and obvious from a study of the following description and the accompanying drawings which are merely illustrative of such invention.

DETAILED DESCRIPTION OF THE INVENTION

Figure 1:
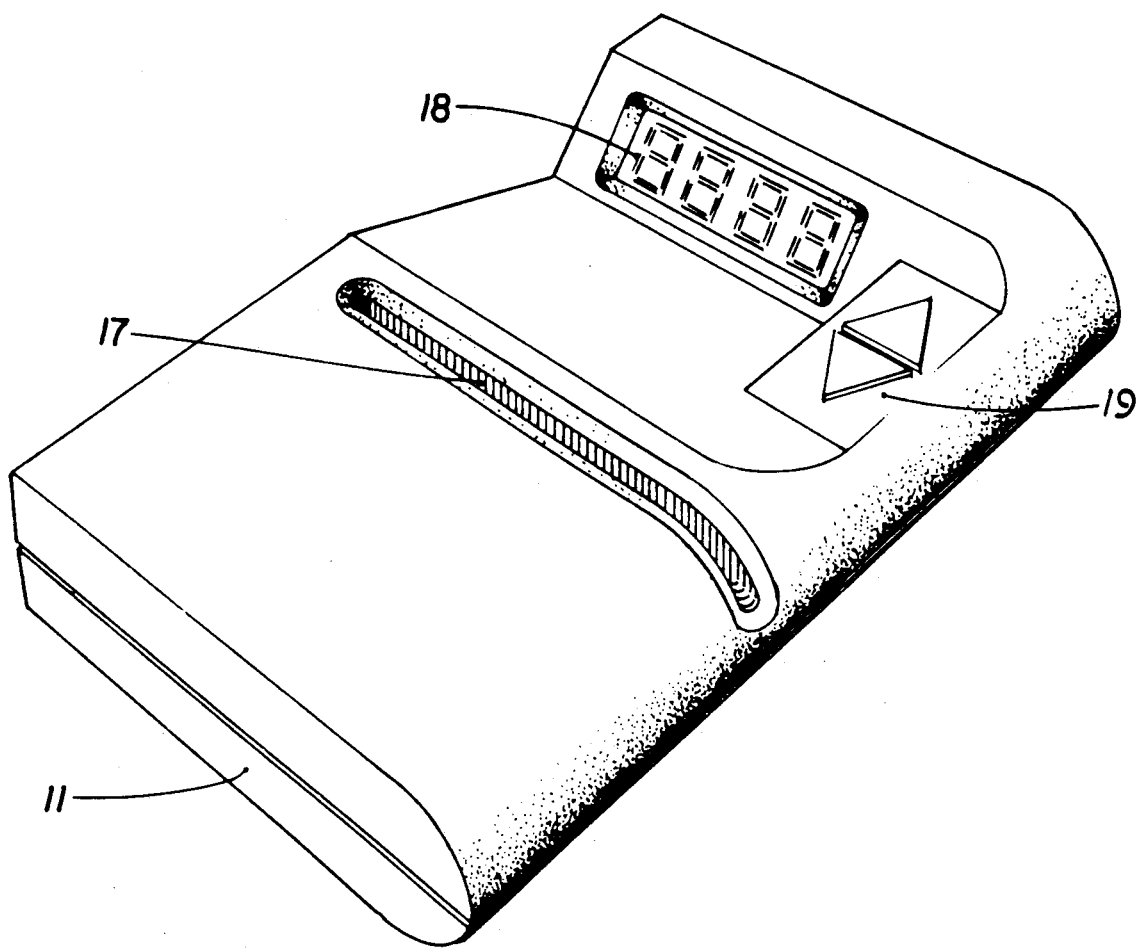
FIG. 1 is a perspective view of the control model of the present invention.
Figure 2:
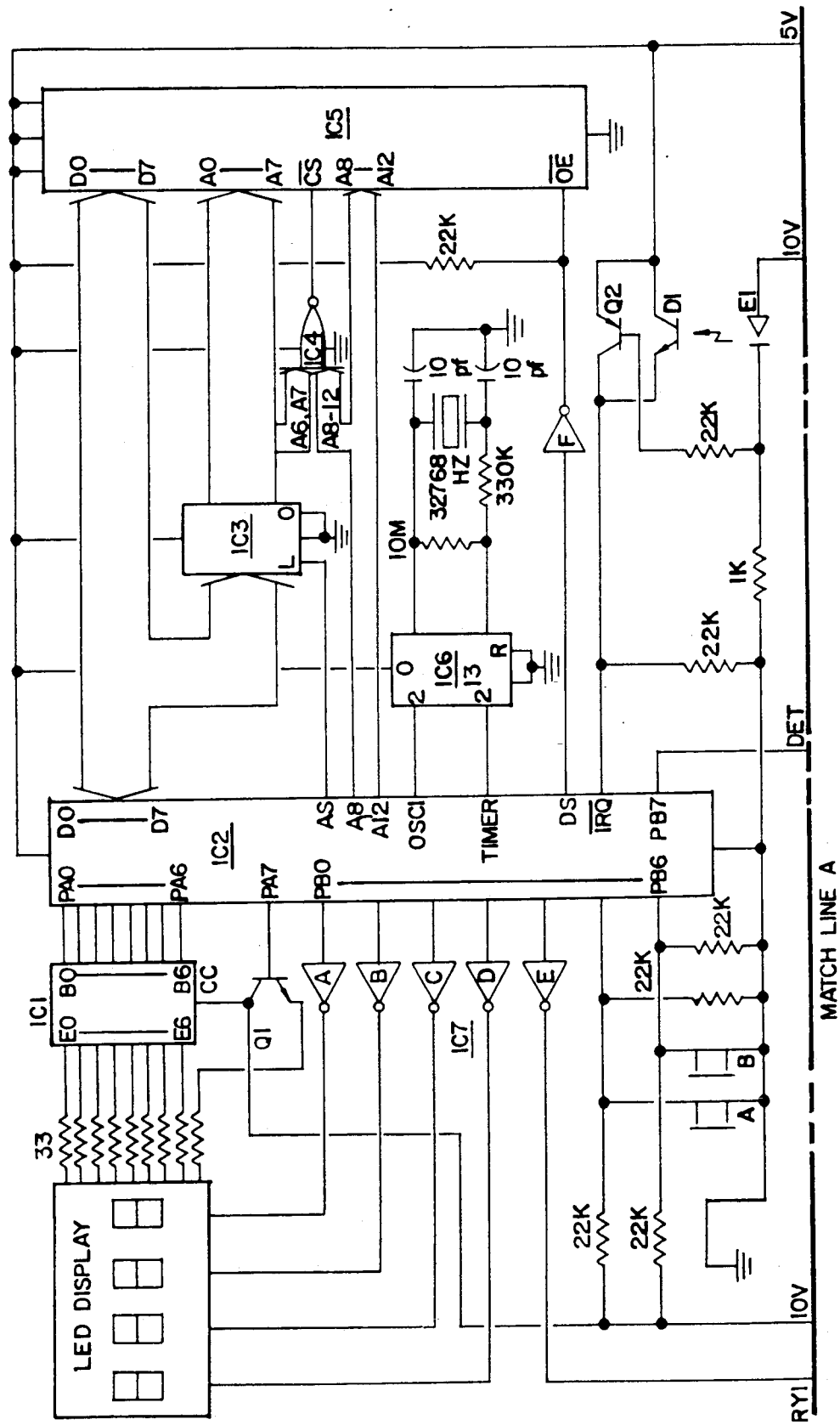
FIG. 2 is a partial schematic view showing the basic control system of the present invention.
Figure 3:
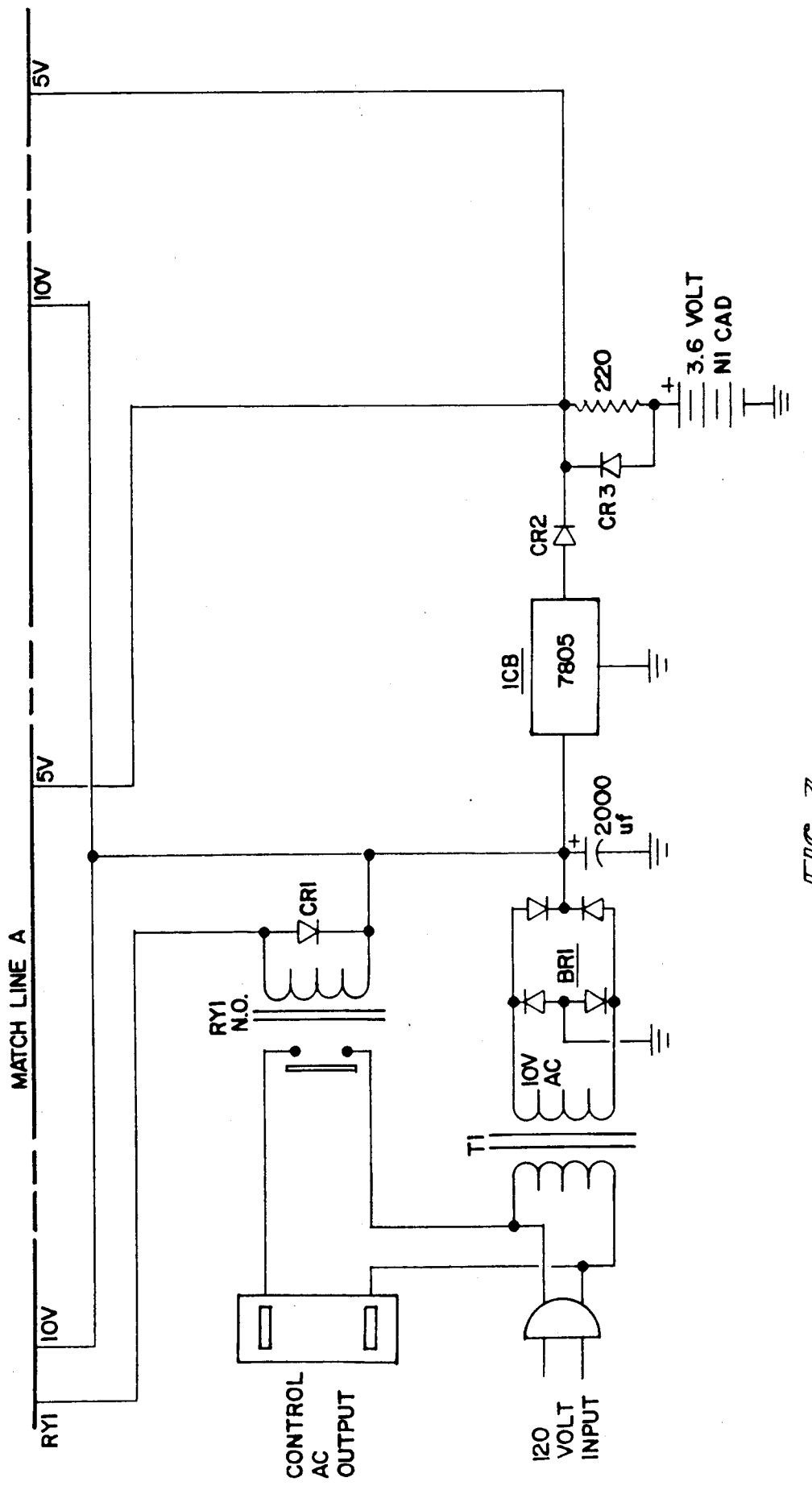
FIG. 3 is a partial schematic view showing the power supply and control for AC operated appliances.

Referring now to the drawings, the control system of the present invention is shown therein and indicated generally by the numeral 10. The control system 10 includes a control module 11 which is interfaced with the circuit of the controlled appliance, a plurality of user cards 13, a master card 14 for each parent, and a program card 15.

The control module 12 is built around a single chip microprocessor, IC2. The operating program for the microprocessor is stored in an external read-only memory (ROM), IC5. ICs 3 and 4 decode memory addresses from the data base and provide switching between internal RAM and external program memory. ICs 3, 4, and 5 can be incorporated internal into microprocessor IC2, to reduce cost and assembly time.

Timing signals for the microprocessor are generated by a frequency divider IC6 from a 32768 Hertz crystal. This an extremely accurate time base which is used to clock the computer, and through the use of certain instructions, keeps the time of day.

Data is input into microprocessor IC2 by means of a card reader consisting of a light emitter, E1, and a light detector, D1. Infra red light from the light emitter, E1, is directed onto the face of the detector, D1, and is used to read data from optically encoded cards. Switches, A and B, are also used to input data into the microprocessor IC2 for programming, setting the clock, and manually inputting user time.

Data, such as user times, is stored in the internal RAM of the microprocessor IC2. The amount of time allotted to each user is stored in a separate time block. In the preferred embodiment, there are nine time blocks; one for each of the eight users and one to store the clock time. Each of the time blocks includes four addresses for storing units of minutes, tens of minutes, units of hours, and tens of hours, respectively.

The internal RAM of the microprocessor IC2 also stores data in three eight bit registers: the ID flag register; the control flag register; and the user flag register. Each of the registers include eight bit positions which correspond to one of the eight user cards 13. The ID flag register is used to indicate which of the user cards 13 are validated. This is done by placing a "1" in the bit position corresponding to the validated user card. A "0" in any bit position would indicate that the corresponding user card 13 has not been validated. The control flag register is used to indicate which of the eight users have been allotted time for using the controlled appliance. Of course, only users which have validated user cards 13 can be allotted time. A "1" in the bit position corresponding to any of the validated user cards 13 indicates that time has been allotted. A "0" indicates that no time has been allotted or that it has expired. The user flag register is used to indicate when one of the users "signs on" to use the appliance. A "1" in any bit position indicates that the corresponding user is "signed on", while a "0" indicates that the user is "signed off".

The internal RAM of the microprocessor IC2 includes additional space for storing preprogrammed time limits which can be added to each user's time on a daily basis. Also, beginning and ending times establishing a predetermined period in which the appliance can be used, can be stored.

Figure 4:
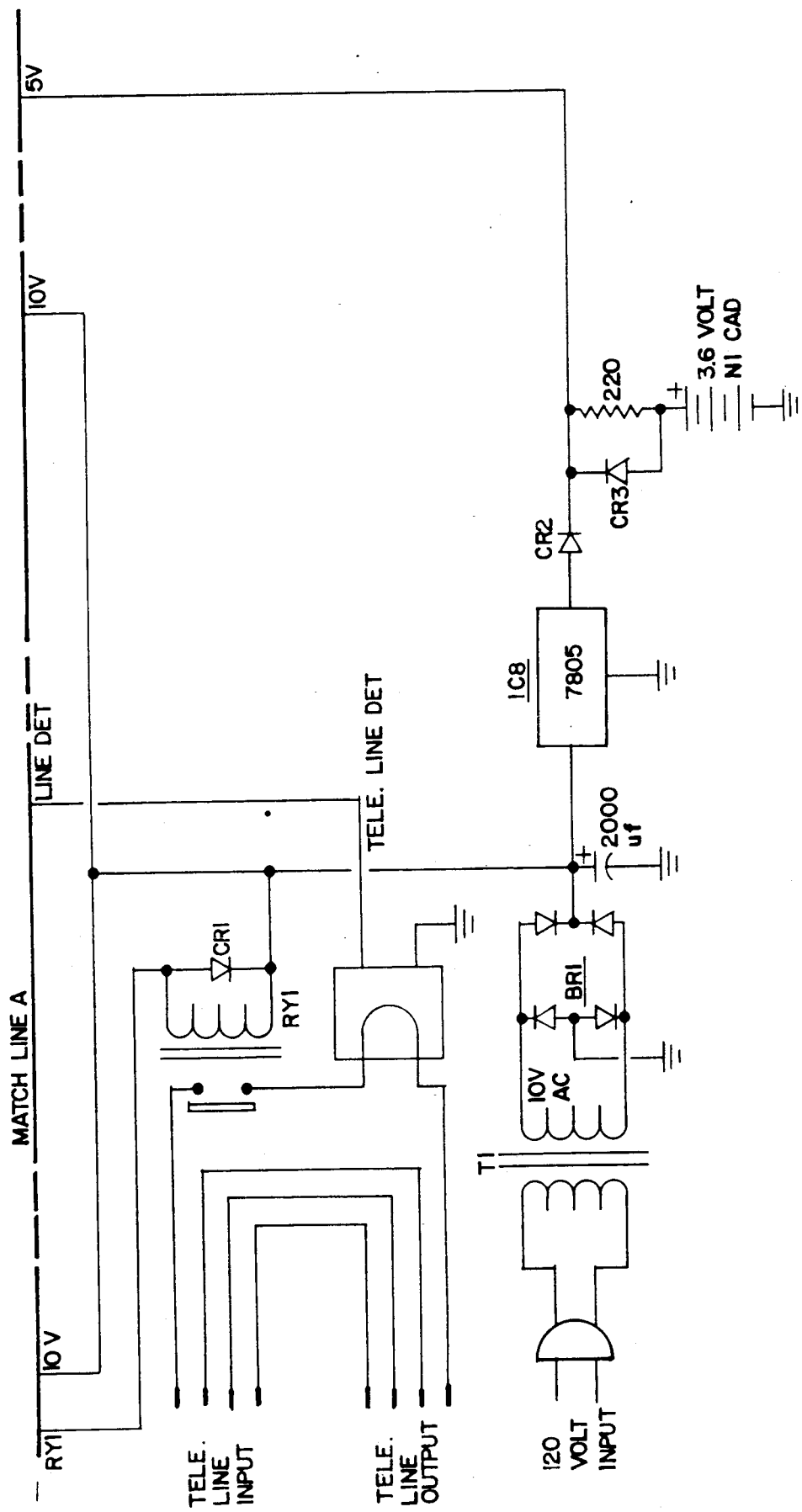
FIG. 4 is a partial schematic view showing the power supply and control for a telephone.
Figure 5:
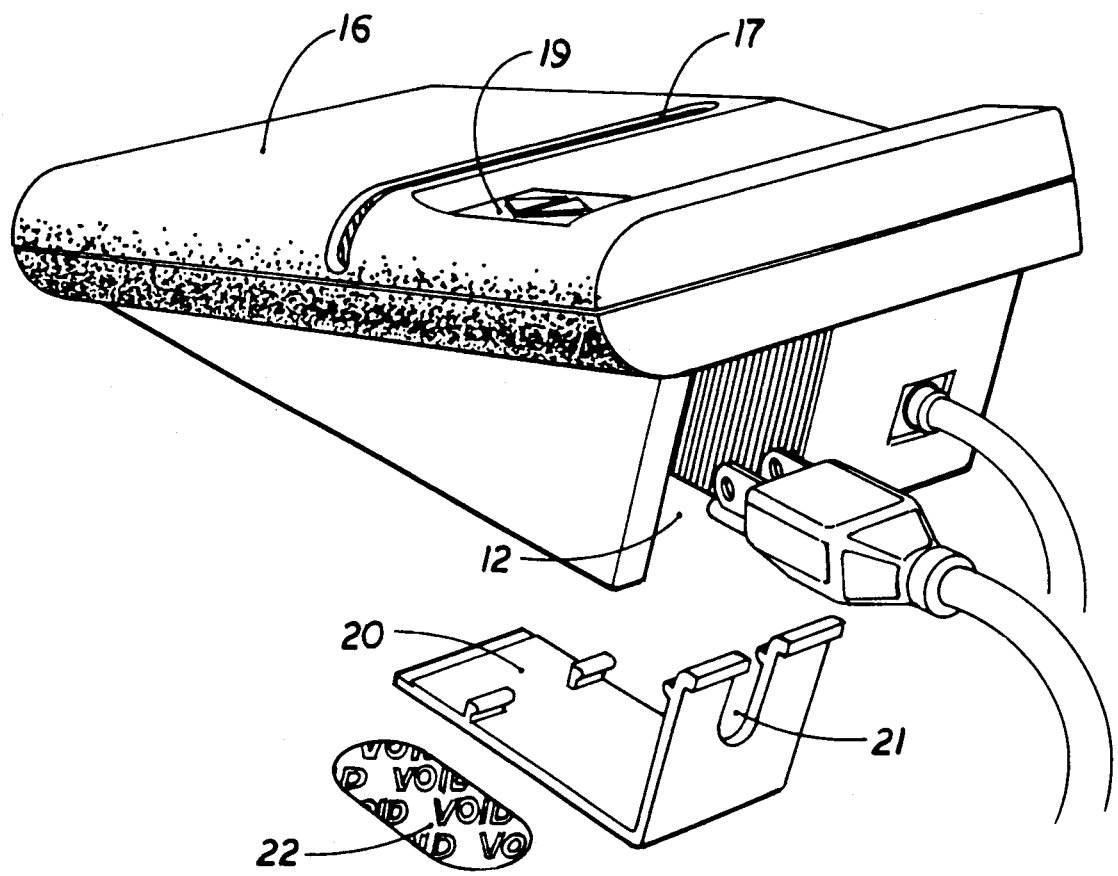
FIG. 5 is a rear perspective view of the control system.
Figure 6:
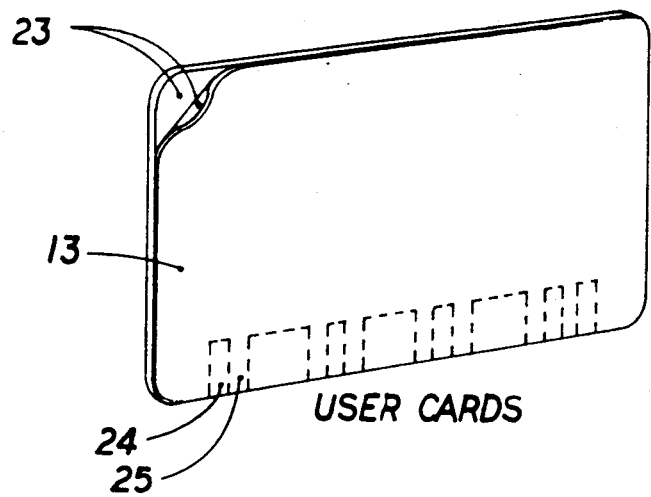
FIG. 6 is a perspective view of the user card.
Figure 7:
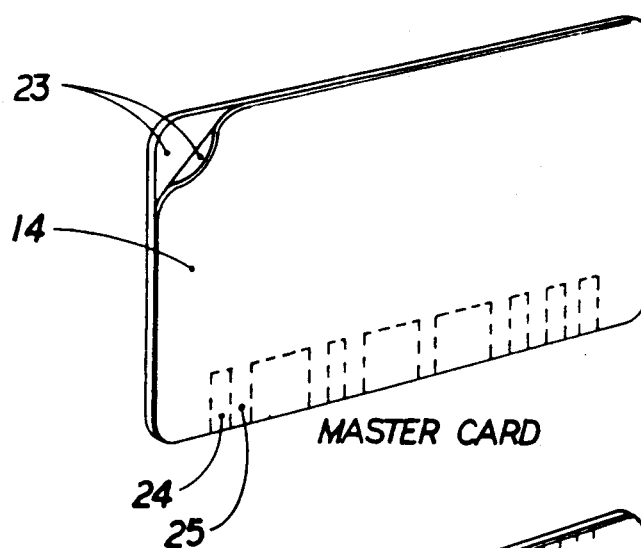
FIG. 7 is a perspective view of the master card.
Figure 8:
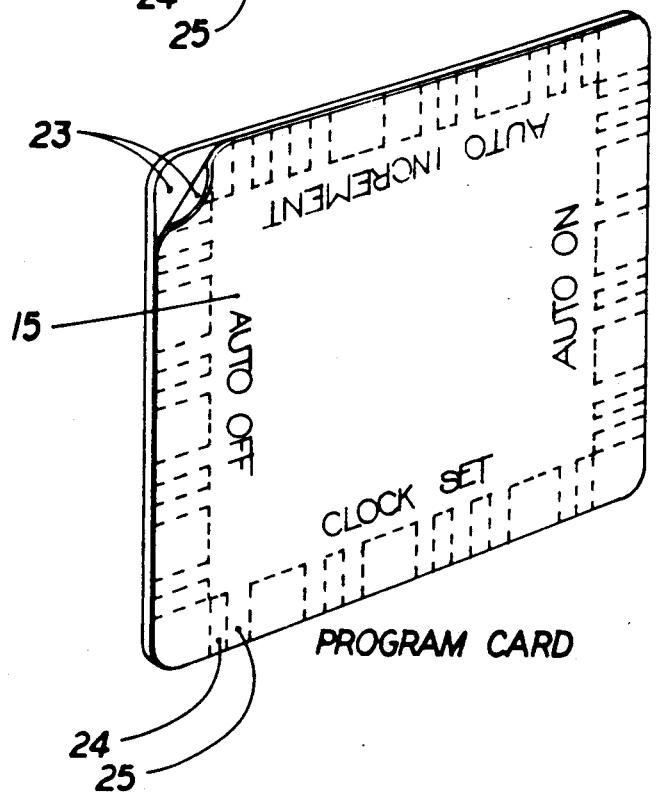
FIG. 8 is a perspective view of the program card.

Output from the microprocessor is used to actuate a relay RY1, which provides external on/off control for the connected appliance through receptacle R1. In the telephone interface version (FIG. 4), a telephone line detector, LD1, is necessary for monitoring the telephone status through the phone cord without actually connecting to the telephone.

Output from the microprocessor is also used to control an LED display, DY1. The display, DY1, includes a four-digit display 30, an AM/PM indicator 31, and a power indicator 32. IC1 is a segment driver for the microprocessor display data going to the LED display, DY1. IC7 and Q1 together form a digit driver for the microprocessor display data.

The power supply for the control device consists of a transformer, T1, bridge rectifier, BR1, and voltage regulator IC8. A battery backup B1, is provided to insure that stored data is not lost during brief power outages. A capacitor may also be used in place of the battery.

The components for the control module 12 are readily commercially available from numerous suppliers. Their components and their suppliers are well known to those skilled in the art.

The control modules' enclosure 16 includes a card slot 17 for guiding the optically encoded cards 13, 14, and 15 between the light emitter, E1, and the detector, D1. Enclosure 16 also includes a window 18 for the LED display DY1 and a pad 19 for mounting push-button switches A and B.

The controlled appliance is connected to the access control module 12 in such a way as to discourage tampering. Receptacle R1, through which the controlled appliance is connected, is housed within an internal compartment 12 in the controlled modules enclosure 16. A cover 20 having a cord slot 21 covers the internal compartment. Once the controlled appliance is connected and the cover 20 is closed, a tamper resistant seal 22 is applied over the crack surrounding the sliding door 20. If the seal is peeled off and then reapplied, it displays a message indicating that the control module 22 has been tampered with.

The user cards 13, master cards 14, and programming card 15 consist of two laminates 23 constructed from polycarbonate. The laminates are transmissive with respect to infra red light and nontransmissive with respect to visable light. An 8 bit binary bar code is embedded between the laminates 23 of each of the cards, 13, 14, and 15. The user cards 13 and the master card 14 are used to enter user identification codes into the microprocessor IC2. The programming card 15 is used to enter program codes.

The bar codes embedded in the cards 12, 14, and 15 comprise a series of bit pairs each of which includes a bar 24 which blocks transmission of infra red light and a space 25 between which transmits infra red light. The bars 24 can be made of metal foil or other non-transmissive material embedded between the laminates 23. In the preferred embodiment, the spaces 25 for each bit pair will have uniform width. The bars 24 will have two different widths, with a wide bar 24 corresponding to a binary "1" and a narrow bar corresponding to a binary "0."

Detector D1, which is used to read the bar code, is connected to the IRQ input of the microprocessor I2 as previously described. Instructions in the microprocessors instruction set allow the logic state of this input to be checked. The circuit is designed to provide the microprocessor with a logical low when the light between the light emitter, E1, and its associated detector D1 is blocked, and a logical high when the light is allowed to pass through the card to the face of the detector D1. When there is no card in the card slot, the detector D1 supplies a logical high to the microprocessor IC2.

As a card is passed through the card slot between the light emitter, E1, and the detector D1, the first bar 24, which is the start bit, blocks the infra red light supplying the microprocessor IC2 with a logical low on its IRQ input. The microprocessor IC2 recognizes this change in state and prepares to read data from the card. In the preferred embodiment, this start bit is always 0 no matter which direction the card is read.

When the first space 25 passes between the light emitter E1 and the detector D1 the input returns to a logical high and the microprocessor begins to count down in hexadecimal code from a starting point $P_0$, which in the preferred embodiment is 0, to a turning point $P_1$ at a predetermined rate r. When the next bar 24 passes between the light emitter E1 and the detector D1 the input changes again to a logical low and the microprocessor begins counting from the turning point $P_1$, which is a negative number, in the direction towards starting point $P_0$ at a rate r/n which in the preferred embodiment is $\frac{1}{2}$ r. The microprocessor stops at ending point $P_2$ when the input changes back to a logical high and begins reading the next bit pair. For each bit pair, the microprocessor IC2 compares the ending point $P_2$ to the starting point $P_0$ and registers either a binary "0" or a binary "1" depending on whether $P_2$ is less than or greater than $P_0$ respectively.

Bits are read sequentially in this manner until all eight bits which make up the coded byte are retracted. The two bits on either end of the code are used to determine the direction in which the card was passed through the card reader and then disregarded. As shown herein, the bit adjacent the start bit will be either a "1" or "0" depending on the direction the card is read. The microprocessor will recognize the direction in which the card is read and if necessary, flip the four bits in the center to determine the user identification code. The four bits in the center identify the user, in the case of a user card 13 or master card 14, or the program function in the case of the program card 15.

It should be apparent from the foregoing that a bit pair corresponding to a binary "0" will include a light transmissive section of width x and a non-transmissive section of width less than nx. Similarly, a bit pair corresponding to a binary "1" will include a light transmissive section of width x and a non-transmissive section of width greater than nx. If the microprocessor counts down from $P_0$ to $P_1$ at rate r, and counts up from $P_1$ to $P_2$ at one-half r so that n=2, then the non-transmissive section must have a width less than 2× (where x=width of transmissive section) to register a binary "0" and a width greater than 2x to register a binary "1." In the preferred embodiment of the invention, the non-transmissive section has a width equal to the transmissive section in each bit pair corresponding to binary "0," and a width three times greater than the transmissive section in each bit pair corresponding to binary "1." This embodiment allows for normal fluctuations in the speed at which the card is passed through the optical card reader.

To use the control system 10 of the present invention, the power cord of the controlled appliance is plugged into receptacle R1 in the control module 12. The door 20 is then placed over the internal compartment with the power cord passing through the cord slot 21. The tamper resistant seal 22 is applied over the door. The power cord of the control module 12 is then connected to a 110 volt outlet to provide power to the control system.

When the system is initially powered, the LED display will read "lost" indicating that all memory is lost. To initialize the control module 12, the user cards 13 to be used must then be validated. This is done by entering the add/delete programming mode.

To enter the add/delete programming mode, the master card 14 is first inserted into the card slot 17 and slid edgewise to the right. If a user card 13 is inserted within 60 seconds after the master card 14 is inserted, the control module 12 will enter the add/delete programming mode. When a user card 13 is read the first time, the microprocessor IC2 sets the ID flag in the ID flag register by placing a "1" in the corresponding bit position. Once a user card 13 has been validated, its corresponding ID flag will not be cleared unless the control device loses all power, in which event all data in the internal RAM will be lost.

After the user card 13 is "read" and the ID flag is set as described above, the microprocessor IC2 will send a signal to the LED display DY1 which will indicate which user card 13 was entered. For instance, the LED display will read UC1 to indicate user card number 1. The administrator/parent may then elect to manually add time to that user card 13 or to deduct time from that user card. Also, if the user card 13 is being entered only for the purpose of validating the user card 13, the administrator/parent can elect to exit the add/delete mode in which case no time will be added or deducted.

To add time to the user card 13, switch A is pressed to increment hours upwardly. When time is added to the user card, the microprocessor will set a control flag to indicate that the user has been allotted time by placing a "1" in the corresponding bit position of the control flag register. To delete hours from the user card, switch B is used to increment hours downwardly. Once the time has been set, the administrator/parent can either exit the add/delete programming mode by reinserting the master card 14, or program time for another user card 13. If the latter is preferred, the administrator/parent simply inserts the next user card 13. In either event, microprocessor IC2 will store the previously programmed time in the appropriate place in its internal RAM. The LED display DY1 will indicate the next user card 13 to be programmed. If it is being entered for the first time, the microprocessor IC2 will set the validator flag by placing a "1" in the corresponding bit position in the validator flag register. Time can then be added or deleted as described above.

When all the user cards 13 which are to be validated have been programmed, the parent/administrator exits the add/delete programming mode. The time programmed by the administrator/parent for each card will then be stored in the internal RAM of the microprocessor IC2 in appropriate time blocks.

Exiting the add/delete programming will also place the control device 10 in a normal operating mode. Other functions such as the auto on/off function, the auto increment fuction, and the clock function, need not be programmed. However, in most instances it will be desirable to do so.

To enter the set clock programming mode, the master card 14 is inserted into card slot 17 as described above. The program card 15 is then inserted into card slot 17 with "SET CLOCK" visable at the top of the program card 15. The display will indicate 1 a.m. and the power indicator will be illuminated. In the set clock programming mode, switch A allows the administrator to increment the hours. The control device 10 employs a twelve hour clock with an a.m./p.m. indicator which is toggled each time the clock passes 12 o'clock. Switch B allows the administrator to increment minutes. When the set-clock programming mode is exited, the time will be stored in the internal RAM of the microprocessor. In the normal operating mode, when no user has "signed on", the clock time will be displayed on the LED display DY1. This is done by setting a display pointer in the internal RAM of the microprocessor to the beginning address of the time block storing the clock time.

The control module 12 can also be programmed to automatically increment the time allotted to each user on a daily basis. For example, the administrator may wish to allot two hours of time to each user per day. To set the auto increment function, the programming card 15 is inserted into card slot 17 with AUTO INCREMENT visable at the top. In the auto increment programming mode, the LED display will display only whole hours. Switches A and B are used to increment and decrement the hours, respectively, to set the number of hours to be added to each user card per day. Thus, in the above example the hours would be scaled up or down until the LED display reads 2. When the auto increment programming mode is exited, the two hour increment will be stored in the internal RAM of the microprocessor. Instructions in the control module's instruction set will cause the control module 12 to add two hours to each user card at 12 midnight each day.

If the administrator wishes to prevent use of the controlled appliance between predetermined hours, he can program the control module 12 to automatically disable and enable the controlled appliance at the predetermined times. For instance, the parent can prevent use of the appliance by his children between 9 p.m. and 8 a.m., by programming those beginning and ending times into the control module 12. To do this, the parent first enters the auto off programming mode by inserting the programming card 15 into card slot 17 as previously described with "AUTO OFF" visable at the top of the programming card 15. In the auto off programming mode, the LED display will display only whole hours. Switch A will increment the hours and switch B will decrement the hours. To program the control module 12 to turn off at 9 p.m., the hours are scaled up or down until the LED display reads 9 p.m.

Next, the programming card 15 is inserted into card slot 17 with AUTO ON visable at the top of the card 15. The control module 12 will automatically exit the auto off programming mode. As in the auto off mode, switches A and B are used to increment or decrement hours until the LED display reads 8 a.m. When the auto on programming mode is exited this time will be stored.

The control module 12 stores the appropriate time for turning the appliance on and off in its internal memory. The microprocessor's instruction set causes it to disable and enable the appliance at the appropriate times, so that the user cards 13 issued to the children cannot be used to actuate the appliance even though the child may have time allotted to him or her. The master card 14 will override the auto on/off function so that use of the appliance by the parent/administrator will be unrestricted.

In the operating mode, any user can actuate the controlled appliance by inserting his or her user card 13 into slot 17 and passing it edgewise between emitter E1 and detector D1. If the control flag for that user has been set, indicating that time has been allotted to that user, the microprocessor IC2 sends a control signal to relay RY1 which actuates the controlled appliance. Microprocessor IC2, then sets a user flag for that user, by placing a "1" in the corresponding bit position of the user flag register. The microprocessor IC2 will automatically set the display pointer to the beginning address of that user's time block so that his time will be displayed on the LED display DY1. At one minute intervals, the microprocessor IC2 will deduct one minute from the time allotted to that user. When a user desires to discontinue use of the appliance, he or she "signs off" from the control device by simultaneously pressing the A and B buttons, or alternatively, by reinserting his or her user card. This will clear his or her user flag and no more time will be deducted from his or her allotted time. If a user fails to "sign off", the microprocessor IC2 will continue to deduct time from that user's allotted time at one minute intervals until the time limit reaches 0, at which time the microprocessor will clear his or her control flag by placing a "0" in the corresponding bit position in the control flag register and automatically deactuate the appliance. That user will thereafter be unable to actuate the appliance until more time is allotted to his or her card, and the control flag is reset.

The control device is capable of tracking time for multiple users. The IC2 will decrement the time allotted to each user which is currently signed on. The LED display DY1 will display the time remaining for the user having the least amount of time remaining. When the time allotment for any one of the users reaches 0, the control device will deactuate the appliance and display on its LED display the user whose time has expired. The remaining users who still have time remaining on their user cards 13 can reactuate the appliance by passing their respective user cards 13 through the card slot 17.

As described above, the microprocessor IC2 checks the control flag register and user flag register at one minute intervals to determine which users have "signed on". If any user has signed on, the microprocessor IC2 automatically deduct one minute from that user's time. Also, at one minutes intervals, the microprocessor deducts one minute from the clock time so that the time of day is kept. Once every hour, the microprocessor checks the beginning time and ending time viewing, so as to enable and disable the appliance at the appropriate times. If the appliance is in use at the preprogrammed ending time, the microprocessor IC2 will automatically deactuate that appliance. Microprocessor IC2 will not thereafter accept any user card 13 until the beginning time.

Finally, once per day, preferably at 12 midnight, the microprocessor IC2 will increment the time allotted to each user by the amount which was programmed by the parent/administrator during the auto increment programming mode. The microprocessor IC2 will check the ID flag register and add the appropriate time to each card which has been validated, and if necessary, set the control flag for those users. Thus, the control device can be programmed so that a predetermined time limit will be added to each user's card on a day-by-day basis.

The control device of the present invention not only limits the use of the controlled appliance by the child, but also plays a role in the positive reinforcement of desired behavior. Children are also disciplined to budget time, a skill which will be beneficial in later years.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A device for allowing a parent to control the use of an appliance by one or more children comprising:
   (a) a plurality of child user cards, each encoded with a different user identification code;
   (b) control means responsive to input of a user identification code from a valid user card for actuating the controlled appliance, the control means including:
      1) a memory device for storing the amount of actual user time allotted individually to each user;
      2) card reading means for allowing a user to input his user identification code;
      3) means for actuating the controlled appliance when amount of actual user time allotted to such user is greater than zero;
      4) tabulating means for automatically decrementing the amount of actual user time allotted to the then current user once the controlled appliance is actuated until the appliance is deactuated;
      5) means for deactuating the controlled appliance when the amount of actual user time allotted to the then current user reaches zero; and
      6) programming means for allowing an administrator to manually increment or decrement the amount of actual user time previously allotted to any user to positively reinforce desired behavior and to discourage undesired behavior.

2. The control device of claim 1 wherein the control means further includes disabling means for enabling and disabling the controlled appliance at predetermined times, which disabling means overrides the actuating means and renders all user cards invalid during the disabled periods.

3. The control device of claim 1 wherein the control means further includes means for automatically incrementing the time allotted to each user at predetermined times.

4. A device for allowing one person, and administrator, to control the use of an appliance by a plurality of users comprising:
   (a) plurality of user cards, each encoded with a discrete user identification code;
   (b) control means responsive to input of a user identification code from a valid user card for actuating the controlled appliance, the control means including:
      (1) memory means for storing the amount of time allotted to each user;
      (2) a control flag register having a plurality of control flags, one corresponding to each of the users, which flags are set to indicate that the corresponding user has time allotted and which flags are cleared to indicate that the corresponding user has no time allotted;
      (3) a user flag register having a plurality of user flags, one corresponding to each of the users, which user flags are set to indicate that the corresponding user is currently using the appliance, and which flags are cleared to indicate that the corresponding user is not currently using the appliance;
      (4) card reading means for allowing a user to input his user identification code into the control means;
      (5) processing means including:
         (a) means responsive to input of a user identification code for scanning the control flag register and, when the corresponding control flag is set, for actuating the controlled appliance and setting the corresponding user flag;
         (b) means for scanning the user flag register at predetermined intervals and for decrementing time equal to the predetermined interval from each user whose corresponding user flag is set;
         (c) means for deactuating the controlled appliance and for clearing the corresponding control flag and all of the user flags when the time allotted to the then current users reaches zero; and
      (6) programming means for allowing the administrator to program the amount of time allotted to each user.

5. The controlled device of claim 4 wherein said control means further includes:
   (a) means for keeping time of day;
   (b) means for storing the beginning and ending times for a predetermined use period;
   (c) means for comparing the time of day to the beginning and ending times and for enabling the controlled appliance when the time of day equals the beginning time, and for disabling the controlled appliance when the time of day equals the ending time.

6. The controlled device of claim 5 wherein the control means further include:
   (a) means for storing a predetermined time limit for using the controlled appliance;
   (b) means for automatically adding the predetermined time limit to the time allotted to each user at a predetermined interval.